(12) United States Patent
Stiller et al.

(10) Patent No.: US 6,544,491 B1
(45) Date of Patent: *Apr. 8, 2003

(54) METHODS OF MAKING A CARBON FOAM (75) Inventors: Alfred H. Stiller, Morgantown, WV (US); Janusz Plucinski, Glendale, WV (US); Aaron Yocum, Core, WV (US)

(73) Assignee: West Virginia University, Morgantown, WV (US)

( * ) Notice: Subject to any disclaimer, the term of this patent is extended or adjusted under 35 U.S.C. 154(b) by 284 days.

This patent is subject to a terminal disclaimer.

(21) Appl. No.: 09/654,211

(22) Filed: Sep. 1, 2000

Related U.S. Application Data (63) Continuation-in-part of application No. 09/095,909, filed on Jun. 11, 1998, which is a division of application No. 08/887,556, filed on Jul. 3, 1997, now Pat. No. 5,888,469, which is a continuation of application No. 08/455,742, filed on May 31, 1995, now abandoned.

(51) Int. Cl.[7] .............................................. C01B 31/04
(52) U.S. Cl. ................................. 423/448; 423/445 R
(58) Field of Search .............................. 423/445 R, 448

(56) References Cited

U.S. PATENT DOCUMENTS

| | | |
|---|---|---|
| 4,025,689 A | 5/1977 | Kobayashi et al. |
| 4,029,749 A | 6/1977 | Murakami |
| 4,096,097 A | 6/1978 | Yan |
| 4,225,463 A | 9/1980 | Unger et al. |
| 4,272,349 A | 6/1981 | Furutani et al. |
| 4,272,356 A | 6/1981 | Stiller et al. |
| 4,289,604 A | 9/1981 | Kolling et al. |
| 4,318,824 A | 3/1982 | Turner |
| 4,487,687 A | 12/1984 | Simo et al. |
| 4,518,483 A | 5/1985 | Dickakian |
| 5,075,139 A | 12/1991 | Crumbach et al. |
| 5,888,469 A * | 3/1999 | Stiller et al. ............ 423/445 R |
| 6,241,957 B1 * | 6/2001 | Stiller et al. ................ 423/448 |

OTHER PUBLICATIONS

Hager et al., "Idealized Ligament Formation and Geometry in Open–Celled Foams", 21st Biennial Conference on Carbon, Conf. Proceedings, American Carbon Society, Buffalo, New York, pp. 102–103 (1993), no month.

Reticulated Vitreous Carbon (An Exciting New Material), Energy Research and Generation, Inc., Oakland, California (undated).

(List continued on next page.)

Primary Examiner—Stuart L. Hendrickson
(74) Attorney, Agent, or Firm—Arnold B. Silverman; Eckert Seamans Cherin & Mellott, LLC (57) ABSTRACT

A method of making anisotropic carbon foam material includes de-ashing and hydrogenating bituminous coal, separating asphaltenes from oils contained in the coke precursor, coking the material to create a carbon foam. In one embodiment of the invention, the carbon foam is subsequently graphitized. The pores within the foam material are preferably generally of equal size. The pore size and carbon foam material density may be controlled by (a) altering the percentage volatiles contained within the asphaltenes to be coked, (b) mixing the asphaltenes with different coking precursors which are isotropic in nature, or (c) modifying the pressure under which coking is effected. In another embodiment of the invention, solvent separation is employed on raw bituminous coal and an isotropic carbon foam is provided. The carbon foam materials of the present invention are characterized by having high compressive strength as compared with prior known carbon foam materials. A further embodiment is disclosed wherein the pitch material which is employed as a feedstock in the process may be coal feedstock or a petroleum feedstock employed alone or in combination with each other. In another embodiment, an inert gas is saturated into the asphaltenes under a first pressure and coking is subsequently effected at a second pressure lower than the first to facilitate coking.

63 Claims, 4 Drawing Sheets

OTHER PUBLICATIONS

Wang, "Reticulated Vitreous Carbon—A New Versatile Electrode Material", Electrochimica Acta, vol. 26, No. 12, pp. 1721–1726 (1981), no month.

Donnet et al., "Carbon Fiber Applicatons" Carbon Fibers, Marcel Decker, pp. 222–261 (1984), no month.

Edie et al., "Melt Spinning Pitch–Based Carbon Fibers", vol. 27, No. 5 pp. 647–655, Pergamon Press (1989), no month.

Pekala et al., "Carbon Aerogels and Xerogels", Mat. Res. Soc. Symp. Proc. vol. 270, pp. 3–14 (1992), no month.

Mehta et al., "Graphite Carbon Foams: Processing and Characterization", $21^{st}$ Biennial Conference on Carbon, Conf. Proceedings, American Carbon Society, Buffalo, New York, pp. 104–105, 1993, no month.

Hall et al., "Graphite Foams as Potential Structural Materials", $21^{st}$ Biennial Conference, Conference on Carbon, Conf. Proceeding, American Carbon Society, Buffalo, New York, pp. 100–101, 1993, no month.

* cited by examiner

METHODS OF MAKING A CARBON FOAM

CROSS REFERENCE TO RELATED APPLICATION

This application is a Continuation-in-Part of U.S. Pat. application Ser. No. 09/095,909, filed Jun. 11, 1998, which is a division of U.S. patent application Ser. No. 08/887,556 entitled "Method of Making a Carbon Foam Material and Resultant Product," filed Jul. 3, 1997, now U.S. Pat. No. 5,888,469, which was a continuation of U.S. patent application Ser. No. 08/455,742, filed May 31, 1995 now abandoned.

BACKGROUND OF THE INVENTION

1. Field of the Invention

The present invention relates to a method of making an improved carbon foam material and particularly a graphitized carbon foam material having superior compressive strength and electrical conductivity.

2. Description of the Prior Art

It has been known for many decades that coal can be beneficiated for application in a wide variety of environments. For example, it has been known that coal may be employed as a fuel in electric utility plants and, in respect of such usages, beneficiating of the coal will reduce the ash content and the amount of sulfur and nitrogen species contained in the gaseous exhaust products.

It has also been known to convert coal into coke for use in various process metallurgy environments.

It has also been known to create carbon foam materials from feedstocks other than coal, which can be glassy or vitreous in nature, and are brittle and not very strong. These products which lack compressive strength tend to be very brittle and are not graphitizable. See, generally, Wang, "Reticulated Vitreous Carbon—A New Versatile Electrode Material," Electrochimica Acta, Vol. 26, No. 12, pp. 1721–1726 (1981) and "Reticulated Vitreous Carbon An Exciting New Material," Undated Literature of ERG Energy Research and Generation, Inc. of Oakland, Calif.

It has been known through the analysis of mechanical properties of carbon fibers that long-range crystallite orientation is achieved by alignment of the precursor molecules during fiber spinning. In "Idealized Ligament Formation in Geometry in Open-Cell Foams" by Hager et al., 21st Biennial Conference on Carbon, Conf. Proceedings, American Carbon Society, Buffalo, N.Y., pp. 102–103 (1993), a model analysis regarding interconnected ligament networks to create geometric evaluation of hypothetical ligamentous graphitic foam is disclosed. This model analysis, however, does not indicate that graphite foam was made or how to make the same.

It has been suggested to convert synthetic naphthalenic mesophase pitch into a carbon foam product by employing a blowing/foaming agent to create bubbles in the material, followed by graphitization of the resultant carbonized foams above 2300° C. See "Graphitic Carbon Foams: Processing and Characterizations" by Mehta et al., 21st Biennial Conference on Carbon, Conf. Proceedings, American Carbon Society, Buffalo, N.Y., pp. 104–105 (1993). It is noted that one of the conclusions stated in this article is that the mechanical properties of the graphitic cellular structure were quite low when compared to model predictions.

It has been known to suggest the use of graphitic ligaments in an oriented structure in modeling related to structural materials. See "Graphitic Foams as Potential Structural Materials," Hall et al., 21st Biennial Conference on Carbon, Conf. Proceedings, American Carbon Society, Buffalo, N.Y., pp. 100–101 (1993). Graphitic anisotropic foams, when evaluated mathematically in terms of bending and buckling properties, were said to have superior properties when compared with other materials in terms of weight with particular emphasis on plate structures. No discussion of compressive properties is provided.

In "Carbon Aerogels and Xerogels" by Pekala et al., Mat. Res. Soc. Symp. Proc., Vol. 270, pp. 3–14 (1992), there are disclosed a number of methods of generating low-density carbon foams. Particular attention is directed toward producing carbon foams which have both low-density (less than 0.1 g/cc) and small cell size (less than 25 microns). This document focuses upon Sol-gel polymerization which produces organic-based aerogels that can be pyrolyzed into carbon aerogels.

In "Carbon Fiber Applications," by Donnet et al. "Carbon Fibers," Marcel Decker, Inc., pp. 222–261 (1984), mechanical and other physical properties of carbon fibers were evaluated. The benefits and detriments of anisotropic carbon fibers are discussed. On the negative side are the brittleness, low-impact resistance and low-break extension, as well as a very small coefficient of linear expansion. This publication also discloses the use of carbon fibers in fabric form in order to provide the desired properties in more than one direction. The use of carbon fibers in various matrix materials is also discussed. A wide variety of end use environments, including aerospace, automotive, road and marine transport, sporting goods, aircraft brakes, as well as use in the chemical and nuclear industries and medical uses, such as in prostheses, are disclosed.

It has been known to make carbon fibers by a spinning process at elevated temperatures using precursor materials which may be polyacrylonitrile or mesophase pitch. This mesophase pitch is said to be achieved through conversion of coal-tar or petroleum pitch feedstock into the mesophase state through thermal treatment. This thermal treatment is followed by extrusion in a melt spinning process to form a fiber. The oriented fiber is then thermoset and carbonized. To make a usable product from the resulting fibers, they must be woven into a network, impregnated, coked and graphitized. This involves a multi-step, costly process. See "Melt Spinning Pitch-Based Carbon Fibers" by Edie et al., Carbon, Vol. 27, No. 5, pp. 647–655, Pergamen Press (1989).

U.S. Pat. No. 5,705,139 discloses a method of employing the solvent extraction process of U.S. Pat. No. 4,272,349 as a basis for selecting a particular coal extract of bituminous coal to produce isotropic coke and graphite from solid extracts obtained by non-destructive solvent treatment of coal. These materials are all solid. The patent also acknowledges the existence of petroleum pitch which is said to have certain prior uses in respect of a binder pitch, as well as possible use as a raw material for graphite or other carbon articles, but is said to suffer the same disadvantages as petroleum coke.

U.S. Pat. No. 4,025,689 discloses the use of a carbonaceous substance which may be petroleum coke, pitch coke, graphite, coal, charcoal or carbon black in making a graphitized hollow sphere wherein a foamed polystyrene coated with a carbonaceous powder and binder are heated to volatilize the core in making the porous article.

U.S. Pat. No. 4,289,604 discloses a method for manufacturing isotropic coke from a tar or tar pitch.

There remains, therefore, a very substantial need for an improved method of making a carbon foam product which has enhanced compressive strength and is graphitizable.

SUMMARY OF THE INVENTION

The present invention has met the above-described needs. In one preferred method of the present invention, a coke precursor is provided by de-ashing and hydrogenating bituminous coal. The hydrogenated coal is then dissolved in a suitable solvent which facilitates de-ashing of the coal and separation of the asphaltenes from the oil constituent. The asphaltenes are subjected to coking, preferably at a temperature of about 325° C. to 500° C. for about 10 minutes to 8 hours to devolatilize the precursor asphaltenes. The coking process is preferably effected at a pressure of about 15 to 15,000 psig. The anisotropic carbon foam so created is then cooled. In a preferred practice of the invention, the anisotropic carbon foam so created is subsequently graphitized. As an alternate to employing hydrogenation, solvent de-ashing of the raw coal alone may be employed in order to create the asphaltenes which are then coked and graphitized in the same manner. With this approach, an isotropic product is produced from the solvent extraction of raw unhydrogenated coal.

In a preferred practice of the invention, a blend of hydrogenated and unhydrogenated solvent separated asphaltenes may be employed in order to adjust the degree of anisotropy present in the carbon foam. Also, it is preferred that the voids in the foam may be generally of equal size. The size of the individual bubbles or voids may be adjusted by altering the amount of volatile material contained in the asphaltenes or varying the pressure under which coking is effected.

In a preferred practice of the invention, after coking, the foamed material is subjected to calcining at a temperature substantially higher than the coking temperature to remove residual volatile material. The preferred temperature is about 975° C. to 1025° C. and the time is that which is adequate to achieve a uniform body temperature for the material.

In the present invention, petroleum feedstock may be employed in making the carbon foam. The petroleum feedstock may be used alone in making anisotropic foams or as a mixture with coal feedstock in making anisotropic foams. With either approach, the methods of the present invention may be essentially the same as in respect of using coal feedstock as the sole feedstock.

In another embodiment of the present invention, the asphaltenes are saturated with an inert gas under a first pressure followed by depressurization to a second pressure which is lower than the first pressure at which pressure foaming of the carbon material is achieved.

The method produces a graphitized carbon foam product having a compressive strength in excess of about 600 lb/in$^2$.

It is an object of the present invention to provide a method of producing coal-derived carbon foam which may be graphitized.

It is a further object of the present invention to provide such a method which may be produced by hydrogenating bituminous coal followed by separation of asphaltenes, and coking the same.

It is a further object of the present invention to provide a method which permits control of the degree of anisotropy of the carbon foam.

It is a further object of the present invention to provide such a method wherein solvent partitioning of the unhydrogenated coal or hydrogenated coal is employed to select the proper fraction for making the desired foam or removing inorganic species from the coal.

It is a further object of the present invention to provide such a method which permits control over the size of the voids in the carbon foam and the density of the same.

It is a further object of the invention to provide a method of producing such a product which is capable of being graphitized and has much higher compressive strength than previously known carbon foams.

It is a further object of the present invention to provide such a method which produces a controllable, low-density carbon foam product having either isotropic or anisotropic graphite structure which may have open-cell or close-cell configurations.

It is a further object of the present invention to provide a method of producing such a product which is lightweight and possesses a controllable degree of electrical and thermal conductivity.

It is a further object of the present invention to produce a carbon foam product from petroleum feedstock employed alone or employed in a blend with coal feedstock, depending on the type of foam to be produced.

It is a further object of the present invention to produce a carbon foam product from a pitch material wherein an inert gas is saturated into the asphaltenes under a high pressure with foaming under a low pressure following.

These and other objects of the invention will be more fully understood from the following detailed description of the invention on reference to the illustrations appended hereto.

DESCRIPTION OF THE PREFERRED EMBODIMENTS

As employed herein, the terms "petroleum feedstock" or "petroleum pitch" means a fraction having a softening point of greater than about 100° C. resulting from cracking of crude petroleum and can form a Bingham fluid by thermal processing. These terms shall expressly exclude mesophase pitch.

As employed herein, the term "pitch material" shall mean a pitch material which is a coal based pitch or a petroleum pitch or a pitch combination of the two.

As employed herein, the term "pitch precursor" means a carbon containing material which can be converted into a pitch material.

Figures 1, 2:
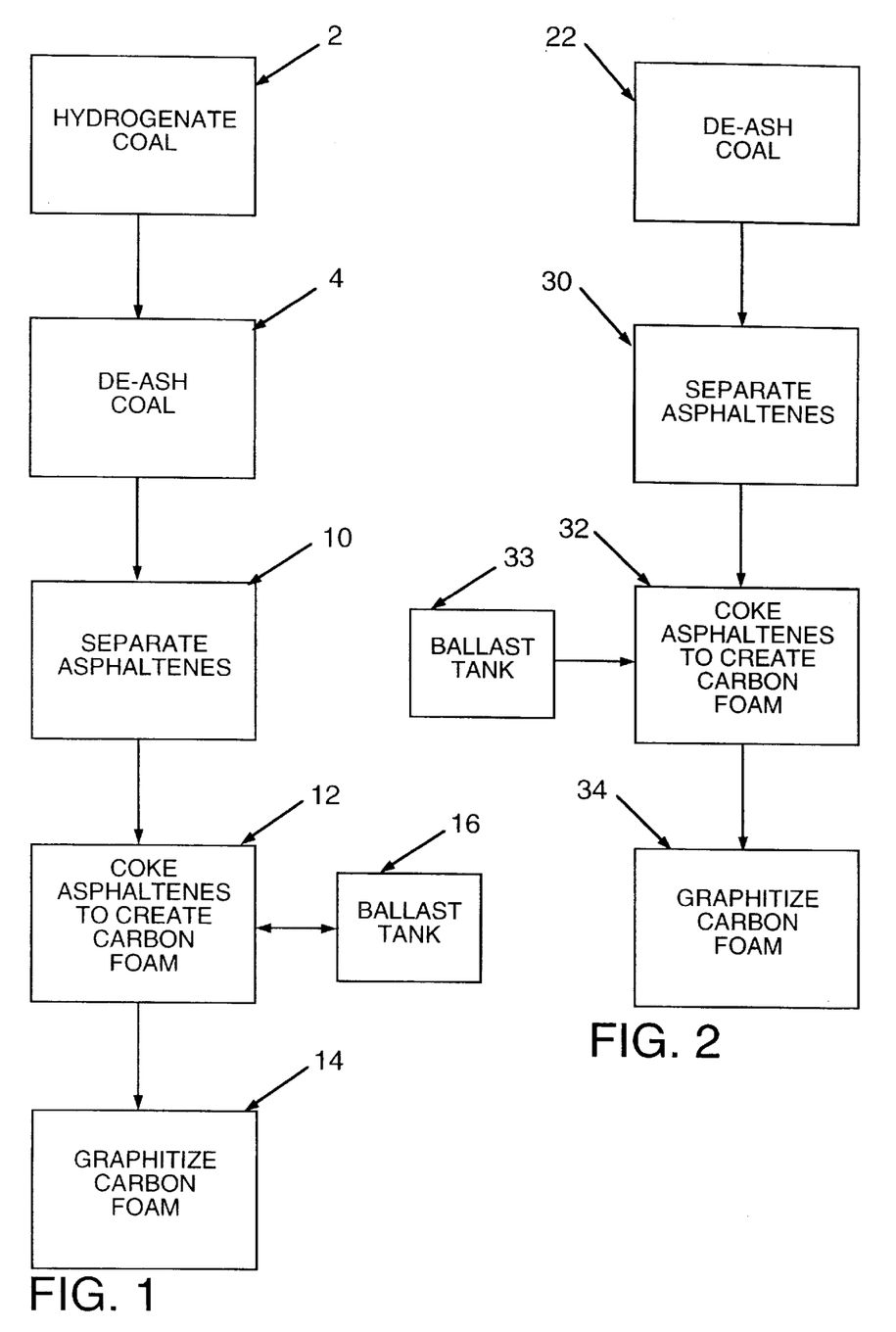
FIG. 1 is a schematic diagram of a first embodiment of the method of producing anisotropic graphitized carbon foam of the present invention.
FIG. 2 is a second embodiment of a method of producing isotropic graphitized carbon foam of the present invention.

In a preferred practice of the present invention, bituminous coal is provided in size of about −60 to −200 mesh and, preferably, about −60 to −80 mesh. In the embodiment, as shown in FIG. 1, wherein anisotropic carbon foam will be produced, the coal is first hydrogenated in step 2. This may be accomplished at a temperature of about 325° C. to 450° C. at a hydrogen over-pressure of about 500 to 2,500 psig hydrogen cold for a reaction time of about 15 minutes to 1.5 hours. Tetralin may be employed as a proton-donating agent. After the reactor has cooled, the contents are removed and the tetralin separated by distillation. The resulting hydrogenated coal may be exhaustively extracted with Tetrahydrofuran (THF) with the residue being filtered to remove inorganic matter. It has been found that under these hydrogenating conditions, more than one-half of the coal mass will be rendered soluble in THF. The hydrogenated coal is subjected to preliminary beneficiation as by de-ashing, which may be accomplished in the manner disclosed in Stiller et al., U.S. Pat. No. 4,272,356. The THF portion will contain all of the asphaltenes, or coal-derived pitch precursors, and oils. The THF, after extraction is complete, may be evaporated for recycling and the recovered coal-derived pitch precursor separated by employing a suitable solvent, such as toluene. The toluene-soluble fraction will be referred to generally as "oils" and the remainder referred to as the asphaltene fraction or coal-derived pitch precursor fraction which is dried. This solvent separation step is identified as step 10 in FIG. 1.

The next step 12 in creating anisotropic carbon foam is to coke the asphaltenes. Coking is preferably achieved at a temperature of about 325° C. to 500° C. for a period of about 10 minutes to 8 hours and, preferably, about 15 minutes to 5 hours in an inert gas atmosphere, such as nitrogen or argon gas in a range of about 15 to 15,000 psig (hot) and preferably about 50 to 1000 psig (hot). The pressure is maintained at a generally constant level by means of ballast tank 16.

In a preferred practice of the invention, heating of the oven begins at 350° C. and the temperature is raised at a rate of 2° C. per minute until the temperature reaches 450° C. at which temperature is held for about 5 to 8 hours. After heating, the oven is turned off and the contents are allowed to cool to room temperature slowly, generally over a 5 to 8 hour period. This foaming operation, when conducted in the coking oven in this manner, serves to partially devolatilize the asphaltenes with the evolution of the volatile matter serving to provide bubbles or voids and thereby create the carbon foam product.

In a preferred practice of the invention, after coking, the foamed material is subjected to calcining at a temperature substantially higher than the coking temperature to remove residual volatile material. The preferred temperature is about 975° C. to 1025° C. and the time is that which is adequate to achieve a uniform body temperature for the material.

If desired, the carbon foam may be used in this form for many uses, such as structural materials, lightweight automotive composites, impact and energy-absorbing structures and heat insulators, for example.

In a preferred practice of the invention, the carbon foam is subjected to graphitizing (step 14) which is preferably accomplished at a temperature of at least 2600° C. The time of the graphitizing step 14 should be continued for a time period long enough to achieve a uniform temperature of at least 2600° C. throughout the entire foam material. The larger the specimen, the longer the time required. A small specimen may require about one hour, for example. In the most preferred practice, the process of graphitizing is accomplished at about 2600° C. to 3200° C.

In the embodiment of FIG. 1, hydrogenation involves large coal molecules being broken apart thermally with the resultant fragments being capped by hydrogen. This results in formation of smaller aromatic molecules. The hydrogenated coal is subjected to solvent extraction by boiling with a solvent to solubilize most of the organic material in the coal. This permits the separation of and removes the inorganic impurities, which are not soluble and, therefore, are removed by simple filtration. A second solvent may be employed to separate the desired asphaltene fraction. Once the solvent is evaporated, the resulting extract is a solid which is free from all inorganic impurities. If desired, in lieu of boiling the second solvent, the oil fraction may be separated by a thermal treatment or distillation.

In order to provide further disclosure regarding this first embodiment, an example will be considered.

EXAMPLE 1

Raw Pittsburgh #8 Coal was hydrogenated by introduction into an autoclave reactor at 350° C. for one hour under 1000 psig (cold) hydrogen using 3:1 (weight) tetralin to coal ratio. After cooling, the hydrogenated coal was removed from the reactor and the tetralin was evaporated. The hydrogenated coal was extracted in THF and the residue was filtered to remove the inorganic species. The THF was evaporated from the filtrate and the resultant extract was dissolved in toluene with the undissolved portion being filtered. The toluene was evaporated to recover the extract. The THF soluble/toluene insoluble (asphaltene portion) extract was placed in a reactor with the nitrogen pressure set at 700 psig in order to effect the foaming operation. The starting temperature was 350° C. and the temperature was elevated at 2° C./minute until 450° C. was reached. It was held at the temperature for five hours and then calcined at 1000° C., after which, it was cooled slowly. The foam was then removed from the reactor. The foam was then graphitized by introducing it into a furnace at a temperature of 2600° C. and a pressure of 0 psig argon wherein it was held for one hour which was the time required to heat the particular specimen to a uniform temperature of 2600° C. and, after cooling, was withdrawn. This produced an anisotropic graphitized carbon foam.

In an alternate embodiment of the invention, the method may be practiced essentially as is shown in FIG. 1, except for elimination of the hydrogenation step 2. This approach is illustrated in FIG. 2 wherein the coal is de-ashed (step 22) in a solvent, such as N-methyl pyrrolidone, for example. There is asphaltene separation (step 30), followed by coking of the asphaltenes to create carbon foam (step 32), under the influence of ballast tank 33, and subsequent graphitizing of the carbon foam (step 34). In effecting the solvent extraction, it is preferred that the solvent-to-bituminous coal ratio be about 3:1 to 10:1 and heating to the solvent boiling point.

Calcining may be effected after foaming and before graphitizing. This calcining may be effected at about 975° C. to 1025° C.

The alternate approach of FIG. 2 produces an isotropic foam carbon which may be graphitized. The bubble or pore sizes of this embodiment will all be equal and control of size may be effected by controlling the amount of volatiles in the asphaltenes, as well as the externally applied pressure through ballast tank 33.

Figure 3:
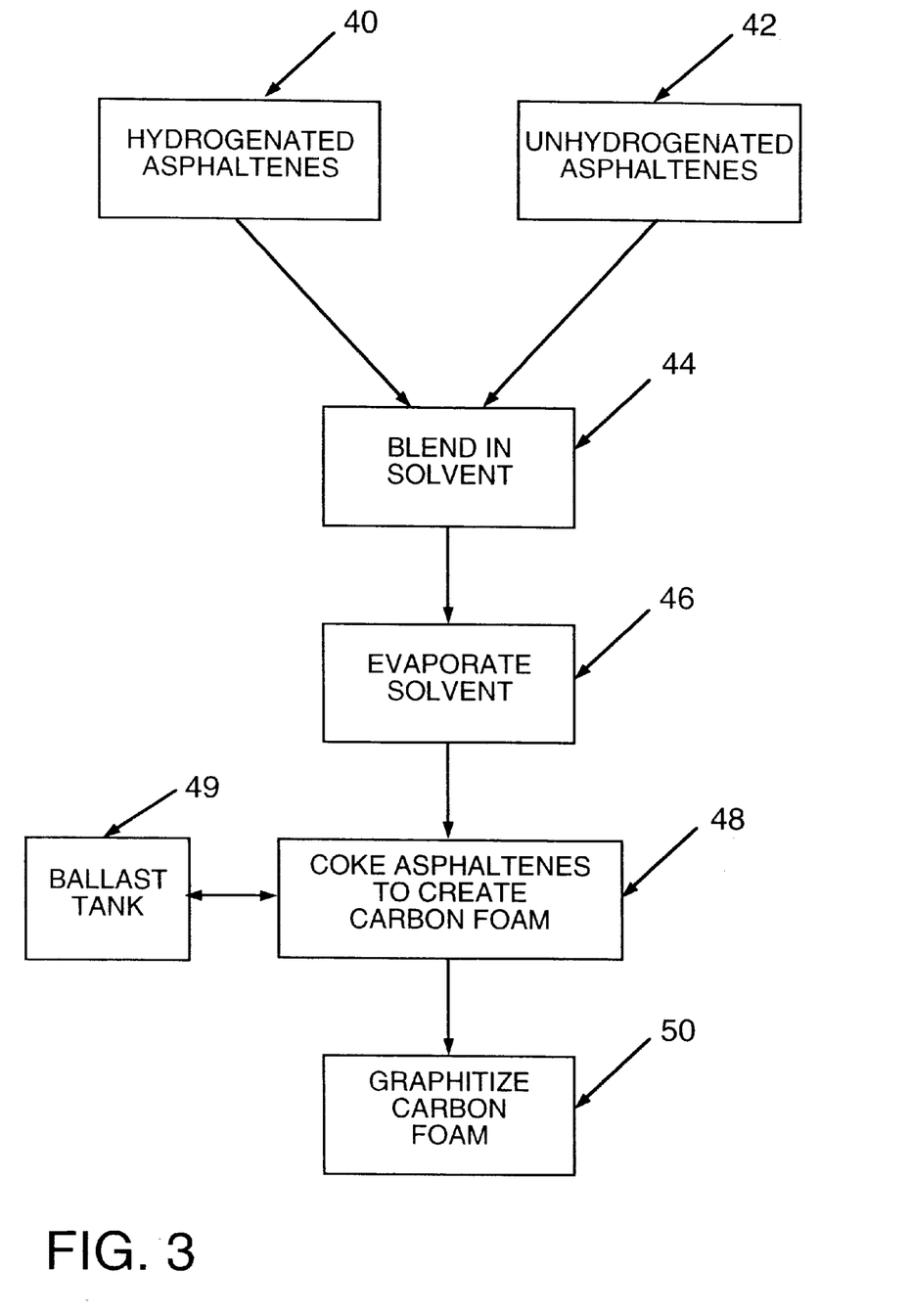
FIG. 3 is a schematic diagram of a preferred method of controlling the degree of anisotropy.

Referring to FIG. 3, the degree of anisotropy may be altered by blending (step 44) the hydrogenated asphaltenes (step 40) from step 10 in FIG. 1 with unhydrogenated asphaltenes in a solvent (step 42) from step 30 of FIG. 2, the latter of which tends to be isotropic. This produces the desired anisotropic characteristics in the final product. The desired degree of anisotropy may be adjusted in this manner in order to provide the preferred properties for the particular end use contemplated. The solvent is evaporated in step 46 after which the asphaltenes are coked in step 48 to create carbon foam and then the carbon foams are graphitized in step 50. Ballast tank 49 is employed to maintain the pressure at the desired level.

With respect to the bubble or void dimension in the foam, the bubbles will generally be of equal dimension to each other. The bubble dimension may be varied by altering the volatile content of the asphaltenes obtained through the extraction process.

Also, the bubble dimension and density of the carbon foam can be altered by altering the external pressure applied through a ballast tank 16 which is operatively associated with the coking oven (step 12) (FIG. 1), as well as ballast tanks 33, 49 (FIG. 2). The higher the ballast pressure applied externally, the smaller the bubble dimension and the higher the density of the resultant product.

The graphitized foams made by the present invention will have a bulk density of about 0.2 to 2 g/cc and, preferably, be about 0.2 to 0.4 g/cc.

It has been found that the graphitized foam product produced in this manner has a very high compressive strength and generally will be greater than about 600 lb/in$^2$. The compressive strength is related to bubble size with smaller bubble size increasing compressive strength.

If desired, pitch material may be introduced into the voids which communicate with the exterior of the carbon foam so as to enhance the strength. This pitch may be a standard petroleum-based impregnation pitch. This product may be coked in order to devolatilize and strengthen the inserted pitch material. The pitch filling the voids may be baked and graphitized.

Among the advantageous properties of the present carbon foam are that it is lightweight and can be either a thermal insulator, which is electrically conductive, or an efficient conductor of heat and electricity. The foam can be molded into any desired shape by coking within appropriately shaped molds. This provides numerous potential end uses. It may be used for its compressive strength, electrical properties and thermal properties. The material may be used, for example, in membranes for separation of ions in solution or particulates in gases at high temperature, it can be used in thermal management devices, such as substrates for integrated circuits or aerospace applications. The material may also be employed in filters including high temperature filters. Also, depending upon the end use, the degree of thermal conductivity can be altered. In general, the isotropic foam is not a high thermal conductor and the non-graphitized foam is a poor thermal conductor and may be employed as thermal insulators. The foam may also find use in building and structural members, such as a substitute for wood and steel beams. It can also be used as a firebreak in aircraft and naval structures. Numerous, advantageous automotive uses, such as in pistons, vehicle frames, and other structural members, impact absorption uses, such as impact absorbers for doors, and connecting rods exist. Further, in view of the strength and lightweight nature of the product, aerospace and airplane uses, such as in wings, brakes, as well as satellite and space station structures involve advantage end uses.

The carbon foam product resulting from the captioned invention may be anisotropic as in the first embodiment (FIG. 1) or isotropic (FIG. 2), or with the degree of anisotropic nature being controlled by the nature of the asphaltene materials mixed (FIG. 3). One means of creating the desired level of anisotropic properties would be to admix a predetermined ratio of a solvent extract from hydrogenated coal with the extract from unhydrogenated coal as in FIG. 3, in a solvent, such as N-methyl pyrrolidone (NMP). The resultant coal-derived pitch precursor or asphaltene produced after solvent evaporation is employed in the coking operation. By adjusting the ratio of unhydrogenated to hydrogenated coal-derived pitch precursor products, different levels of anisotropy may be achieved. In general, the carbon foam materials will have a compressive strength is greater than 600 lb/in$^2$. In addition to impregnating the foam material with pitch to fill the voids, if desired, such pitch filled void materials may be baked and graphitized, if desired. An alternate approach, for some uses, would be to cover the foam with a thin skin of carbon fibers or pitch to seal the outer surface. This would result in a lightweight, yet strong, structural member. In uses such as a gas or liquid filter for environmental remediation, for example, it may be desirable to activate the surface area of the material.

While it will be appreciated by those skilled in the art that numerous uses may be made of a material having the blend of desired properties of those of the present invention, among additional uses would be as a catalyst support for high temperature catalysts, in biological materials, such as bone and prosthetic items, as well as in environmental waste remediation as by heavy metal removal, electrostatic precipitators and in nuclear waste containers wherein undesired leaching or degradation of the carbon material would be resisted.

In a further embodiment of the invention, pitch is introduced into an appropriate vessel in a pressure controllable environment which is adapted to be at a first pressure or at a lower second pressure provided by ballast tanks, for example. A suitable fan for introducing nitrogen or an inert gas is preferably also provided. The pitch is then heated to devolatilize the same at a temperature which may be on the order of about 350° C., for example. This causes the pitch to thicken through cross-linking. The volatiles may be expelled from the vessel by sparging the system with a nitrogen or inert gas flush. They may also be removed by decreasing the pressure in the vessel employed through a vacuum pump. After devolatilization, a first high pressure is imposed on the system. This causes some of the nitrogen or inert gas to be dissolved in the elevated temperature pitch. At a certain point, the pitch will reach equilibrium solubility with the gas and be saturated. The pitch is then heated to a higher temperature which may be on the order of about 500° C., for example. The devolatilization temperature and saturation temperature will be a function of the composition of the pitch and will be known to those skilled in the art. This further causes internal reactions within the pitch such as cross-linking and devolatilization. The pitch further cross-links and thickens. The external pressure causes some of the volatiles to remain within the pitch. These volatiles which are entrapped within the pitch will serve as internal "blowing agents" when the pressure is subsequently reduced to the second pressure which is a lower pressure.

After the gas saturated pitch reaches a higher temperature, it is held at that temperature for a period of time which can be as little as 0.5 hour to up to 24 hours, for example. During this period the pitch has further cross-linking. At the end of this period, the high pressure ballast tank connection is closed and a valve to a second ballast tank having a pressure which is lower than the first is connected. The lower pressure facilitates escape of the dissolved gases. The thickened pitch will then foam. The foam is then cooled. The cellular structure of the foam is maintained through the cooling stage as a result of the cross-linking and thickening which occurred during the heating stage. It is believed that the thickening process probably changes the fluid properties of the pitch from a Newtonian fluid to a Bingham fluid, the latter of which has a yield stress.

Once the foam has cooled to room temperature, the pressure can be reduced to atmospheric pressure. The pitch during this period solidifies and becomes a green coke. The foam may then be calcined, if desired, at a temperature of about 900° C. to 1800° C., and preferably at about 975° C. to 1025° C. Subsequently, the calcined foam may be graphitized at a temperature of about 2400° C. to 3200° C., and preferably about 2600° C. to 3200° C.

A specific preferred process in accordance with this embodiment of the invention involves saturating the asphaltenes with an inert gas. The invention contemplates the asphaltenes having an inert gas introduced and saturation being effected at a first pressure of about 500–2000 psig over a period of about 0.05 to 24 hours and preferably about 2 to 6 hours. Subsequently, the pressure is reduced rapidly to a second pressure of about −15 to 499 psig. It is preferred that the second pressure be at least 10 percent less than the first pressure. Coking to effect production of "green coke" is then effected at a temperature of about 300° C. to 650° C. and preferably 400° C. to 500° C. for about 5 minutes to 24 hours. The lower pressure results in enhanced volatilization thereby facilitating foaming of the asphaltenes to establish the desired carbon foam.

Among the preferred inert gases for this purpose are a gas selected from the group consisting of argon, nitrogen, helium, carbon dioxide, methane, and ethane with argon and nitrogen being the preferred gases.

Figures 4, 5:
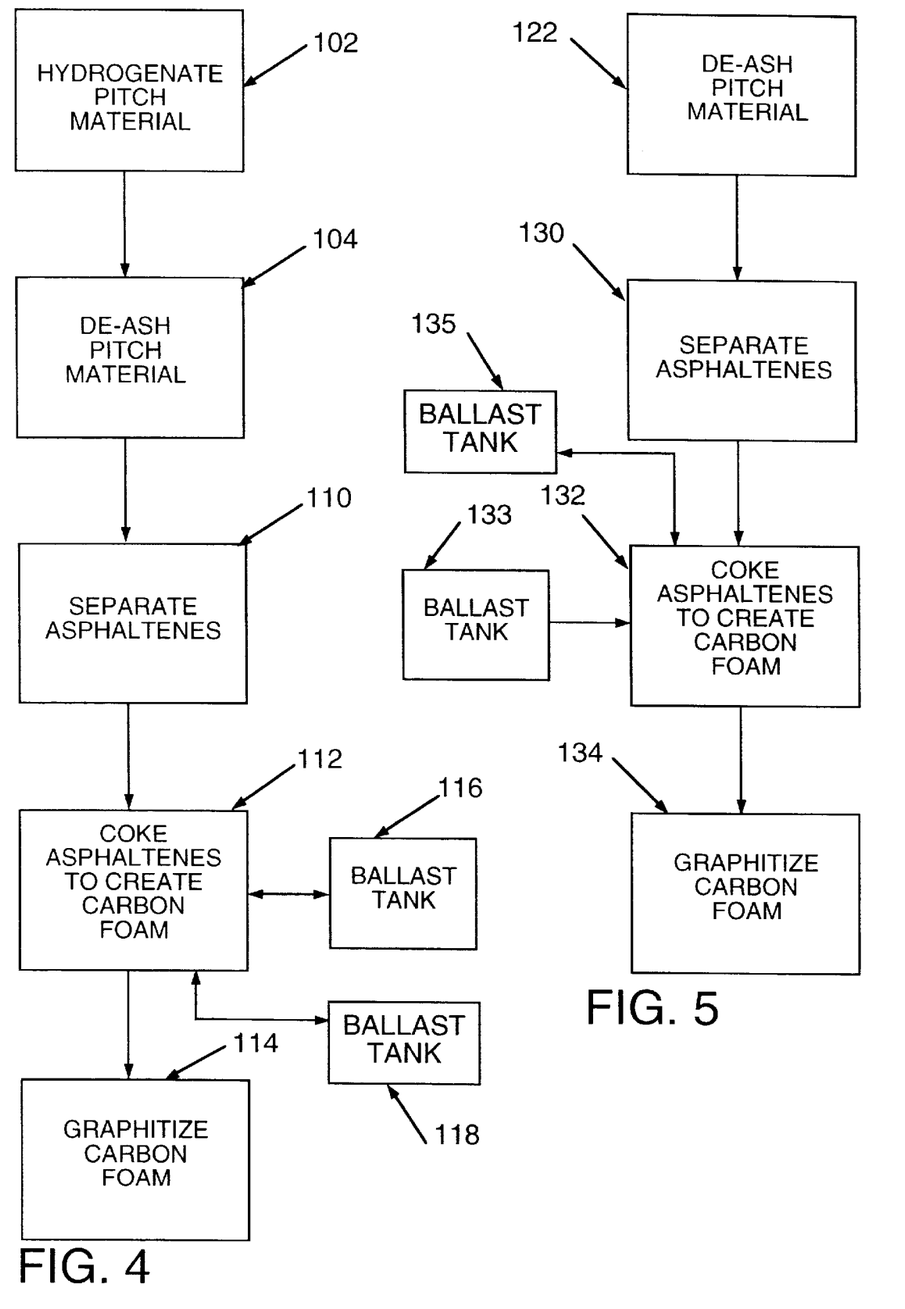
FIGS. 4–6 are generally similar to FIGS. 1 through 3, but reflect the use of either coal feedstock or petroleum feedstock and also the two pressure approach to creating a foamed product.

Referring to FIG. 4 which is generally similar to FIG. 1, a foam with anisotropic domains is created by hydrogenating a pitch material 102 which may be a coal based pitch, a petroleum base pitch or a combination of the two. The material is subsequently de-ashed 104 followed by separation of the asphaltenes 110. At this point, a first ballast tank 116 provides high pressure to the coking oven wherein the asphaltenes and inert gas are present in order to saturate the asphaltenes with the inert gas. After such saturation, the connection with the first ballast tank is terminated and the second ballast tank 118 is placed in communication with the coking vessel 112, thereby creating the lower pressure during the coking period. Coking may be effected in a temperature range of about 300° C. to 650° C. and preferably about 400° C. to 500° C. for a period of about 0.5 minutes to 24 hours and preferably about 0.5 minutes to 2 hours. Subsequently, the carbon foam may be graphitized 114 with intermediate calcining if desired.

Referring to FIG. 5, a carbon foam with isotropic domains is created by de-ashing the pitch material 122 followed by separation of asphaltenes 130. The coking which occurs in enclosure 132 has a first ballast tank 133 providing the high pressure environment for saturation of the asphaltenes by the inert gases and a second ballast tank 135 for establishing the lower pressure for coking. The coked carbon foam may subsequently be graphitized 134 with or without intervening calcining.

Figure 6:
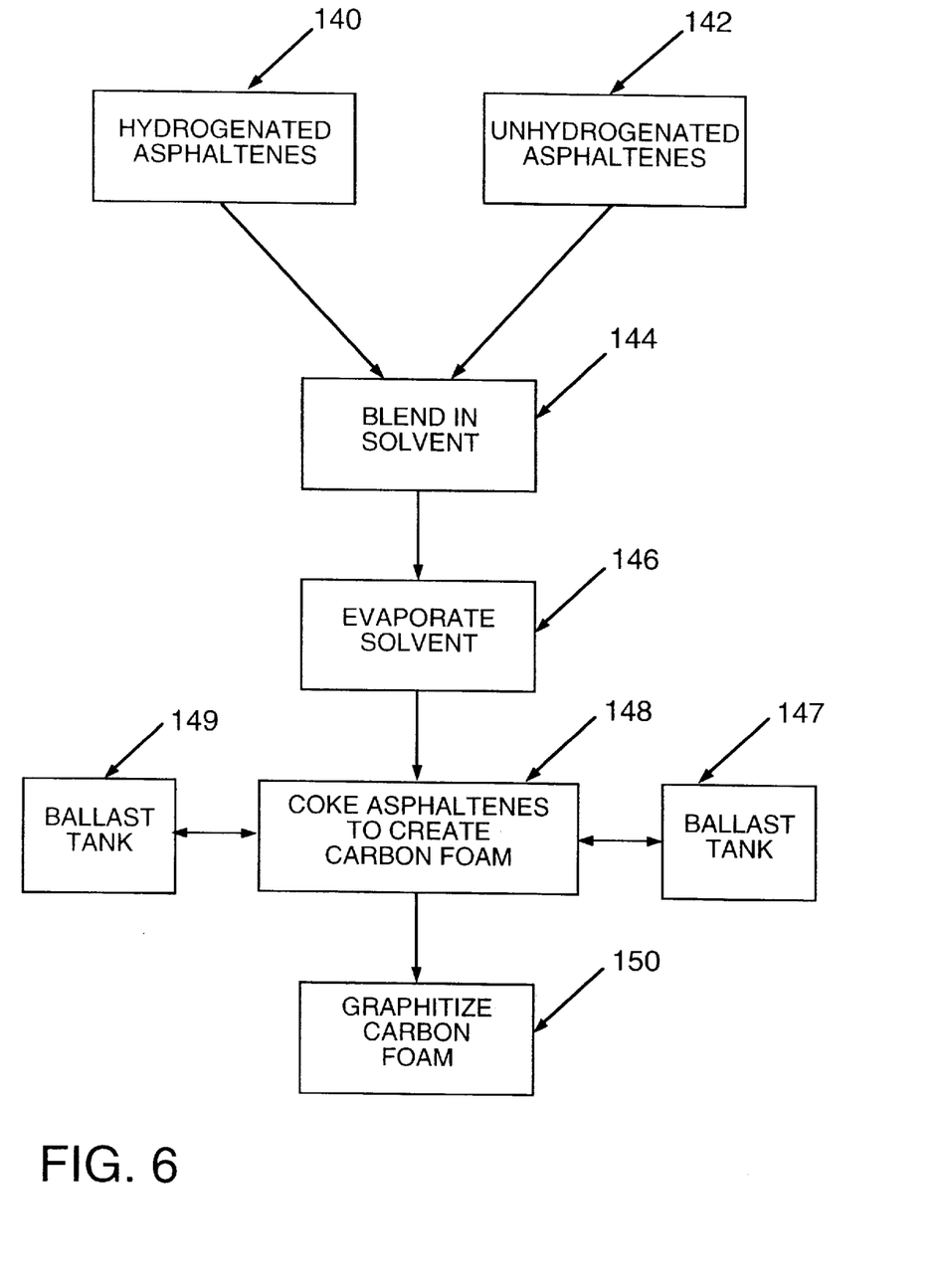

FIG. 6 is similar to FIG. 3 and shows a mixture of hydrogenated asphaltenes 140 and unhydrogenated asphaltenes 142 which are blended in solvent 144 after which the solvent is evaporated. Coking occurs in coking oven 148. The first ballast tank 147 provides the high pressure for saturation of the asphaltenes by the inert gas and a second ballast tank 149 which subsequently provides the lower pressure employed during coking to facilitate volatilization of the inert gas to create the foam. The carbon foam is subsequently graphitized at a temperature of at least 2400° C. and preferably at least 2600° C. with intervening calcining at about 900 to 1900° C. and preferably about 975 to 1025° C., if desired. The preferred upper limit on the calcining temperature is the crystallization temperature.

It will be appreciated that the present invention has provided a method of creating a unique, high-compressive strength, coal-derived carbon foam material, which may be graphitized, and also possesses a great number of desirable properties. An alternate approach employs petroleum feedstock or a combination of petroleum feedstock and coal feedstock.

All of this is accomplished by starting with bituminous coal or petroleum feedstock or a combination of both and employing either the hydrogenated anisotropic approach or the solvent approach without prior hydrogenation to produce an isotropic structure or a blend of the two materials to produce the desired level of anisotropy. In addition, the void or bubble size and density of the carbon foam may be controlled by adjusting the volatile content of the coal-derived pitch precursor or asphaltene which is to be coked and/or adjusting the ballast pressure which is applied externally. This void or bulk size is controlled without requiring dependence on an external blowing/foaming agents. The solvent separation of step 10 of FIG. 1 and step 30 of FIG. 2 serve to remove inorganic species and/or also to select the proper fraction to make the desired foam.

The process of producing a foam depends primarily on two features: (a) the presence of volatile material which, in the preferred practice of the invention, will be internally present; and (b) the viscosity of the parent pitch may be altered by cross-linking which results from devolatilization or the presence of an externally-added cross-linking agent. If desired, for example, a plasticizer may be employed to adjust the viscosity to the desired value. At high viscosity, pitch flow is restricted and this resists the coalescence of bubbles produced by devolatilization. This results in a high-density foam with small bubble size. At lower viscosity, bubbles can coalesce and a more open foam structure with larger bubbles is produced. The devolatilization is controlled by application of external pressure from a ballast tank, such as 16, 33 or 49. At high pressure, less movement of the bubbles takes place and, as a result, the foams are more dense. At low external pressure, the bubbles tend to coalesce and flow so a less-dense foam is produced.

In another embodiment of the invention, the asphaltenes are subjected to saturation by an inert gas as a result of a high pressure applied thereto through ballast tanks 116, 133, 147. This is followed by a reduction in pressure through ballast tanks 118, 135, 149 during coking to facilitate volatilization of the inert gas contained with the asphaltenes to obtain the desired carbon foam.

A further refinement of the present invention involves the use of petroleum feedstocks, such as petroleum pitch. The petroleum pitch may be substituted in its entirety in any of the processes disclosed herein in respect of the method of creating a carbon foam with anisotropic domain as disclosed, for example, in connection with FIG. 1 hereof, or the method of creating a carbon foam with isotrophic domain as disclosed, for example, in connection with FIG. 2 or the use of both hydrogenated and unhydrogenated asphaltenes in achieving a blend of properties as disclosed, for example, in connection with FIG. 3. A suitable petroleum pitch may be purchased commercially and employed in the process. One such pitch is the product sold under the designation A-240 pitch by Ashland Oil Company. Others are also available.

The rheology of the pitch changes to a more Bingham-like fluid. This fluid is suitable for creating foams through the use of a suitable blowing agent. The pitch is then cooled to room temperature and, if desired, can be crushed into a powder form. The processed petroleum pitch can then be placed in a foaming reactor and made into foam in accordance with any of the methods disclosed herein in respect of the methods employing coal pitch.

Coal extract may be mixed with petroleum pitch in order to modify the reactivity of the petroleum pitch toward cross-linking in the thermal treatment. The coal employed to form the coal extract may be identical as that described in the other embodiments of the present invention. It is preferred that the amount of coal extract added to the petroleum pitch prior to the thermal processing of the petroleum pitch be about 10–50 percent on a total feedstock on a weight basis although larger percentages up to about 5–95 percent can be employed, if desired.

In this embodiment of the present invention, creation of a foamed carbon product may be accomplished by any of the methods disclosed in respect of FIGS. 1, 2 and 3 using a pitch material as defined herein meaning that either a coal based pitch or a petroleum pitch, or a combination of the two may be employed.

Whereas particular embodiments of the invention have been described herein for purposes of illustration, it will be evident to those skilled in the art that numerous variations of the details may be made without departing from the invention as set forth in the appended claims.

We claim:

1. A method of making carbon foam with anisotropic domain material comprising hydrogenating and de-ashing a pitch precursor, dissolving said hydrogenated pitch precursor having asphaltenes and oils in a solvent, separating said asphaltenes from said oils, saturating said asphaltenes with an inert gas at a first pressure, and coking said saturated asphaltenes at a second pressure lower than said first pressure at a temperature of about 300° C. to 650° C. for at least 0.5 minutes to devolatilize and foam said asphaltenes to create a carbon foam.

2. The method of claim 1 including
said first pressure being about 500 to 2000 psig.

3. The method of claim 2 including
said second pressure being less than 499 psig.

4. The method of claim 3 including
effecting said saturation for a period of about 0.05 to 24 hours.

5. The method of claim 1 including
effecting said saturation for a period of about 2 to 6 hours.

6. The method of claim 4 including
selecting said inert gas from the group consisting of argon, nitrogen, helium, carbon dioxide, methane, and ethane.

7. The method of claim 1 including
employing a first ballast tank to establish said first pressure, and
employing a second ballast tank to establish said second pressure.

8. The method of claim 1 including
graphitizing said carbon foam at a temperature of at least 2600° C.

9. The method of claim 8 including
after coking but prior to graphitizing, calcining said carbon foam.

10. The method of claim 8 including
effecting said hydrogenation at a temperature of about 325° C. to 450° C.

11. The method of claim 9 including
effecting said hydrogenation at a pressure of about 500 to 2500 psig hydrogen.

12. The method of claim 11 including
effecting said hydrogenation for a time of about 15 minutes to 1.5 hours.

13. The method of claim 8 including
effecting said coking of said asphaltenes at a rate of about 0.5° C. to 2° C. per minute until the desired coking temperature has been reached.

14. The method of claim 3 including
employing a second pressure which is at least 10 percent higher than said first pressure.

15. The method of claim 1 including
effecting said coking for about 5 minutes to 24 hours.

16. The method of claim 1 including
controlling the degree of anisotropy at least in part by mixing asphaltenes from hydrogenated coal with asphaltenes from unhydrogenated coal prior to said coking.

17. The method of claim 15 including
creating said carbon foam with voids of generally uniform size.

18. The method of claim 17 including
controlling said void size at least in part by controlling the volatile content of said asphaltenes prior to coking.

19. The method of claim 17 including controlling said void size at least in part by controlling the pressure applied during the coking step.

20. The method of claim 17 including
said controlling of said void size contributing to the compressive strength of said carbon foam.

21. The method of claim 8 including
said anisotropic graphitized foam having a compressive strength of greater than 600 lb/in$^2$.

22. The method of claim 17 including
producing an open-celled carbon foam material by said method.

23. The method of claim 1 including
after said hydrogenation but prior to said coking removing inorganic impurities from said asphaltenes by said separation.

24. The method of claim 1 including
employing as said pitch precursor bituminous coal having a size of about −60 to 200 mesh.

25. The method of claim 1 including
employing as said pitch precursor a petroleum based material.

26. The method of claim 2 including
effecting said graphitizing at a temperature of about 2600° C. to 3200° C.

27. The method of claim 26 including
effecting said calcining at about 975° C. to 1025° C.

28. The method of claim 24 including
creating said graphitized foams with a density of about 0.2 to 2 g/cc.

29. The method of claim 1 including
mixing said asphaltenes in a solvent,
evaporating said solvents, and
subsequently effecting said coking.

30. The method of claim 21 including
impregnating said open-celled carbon foam material with pitch.

31. The method of claim 30 including graphitizing said pitch impregnating said carbon foam.

32. The method of claim 8 including prior to said separating said asphaltenes from said oils removing inorganic matter from said solvent.

33. The method of claim 32 including employing tetrahydrofuran as said solvent.

34. The method of claim 33 including effecting said separation of said asphaltenes from said oils by employing toluene.

35. The method of claim 1 including employing as said pitch precursor petroleum feedstock admixed with bituminous coal feedstock.

36. The method of claim 35 including effecting said mixture of said bituminous coal feedstock and said petroleum feedstock and said bituminous coal with said coal being about 10–50 percent by weight of the total feedstock weight.

37. The method of claim 1 including employing a first source for providing said first pressure and a second source for providing said second pressure.

38. A method of making carbon foam material with isotropic domain, comprising de-ashing a pitch precursor, dissolving said de-ashed pitch precursor having asphaltenes and oils in a solvent, separating said asphaltene from said oils, hydrogenating and de-ashing a pitch precursor, dissolving said hydrogenated pitch precursor having asphaltenes and oils in a solvent, separating said asphaltenes from said oils, saturating said asphaltenes with an inert gas at a first pressure, and coking said saturated asphaltenes at a second pressure lower than said first pressure at a temperature of about 300° C. to 650° C. for at least 0.5 minute to devolatilize and foam said asphaltenes to create a carbon foam.

39. The method of claim 38 including said first pressure being 500 to 2000 psig.

40. The method of claim 39 including said second pressure being less than 499 psig.

41. The method of claim 40 including effecting said saturation for a period of about 0.05 to 24 hours.

42. The method of claim 38 including effecting said saturation for a period of about 2 to 6 hours.

43. The method of claim 41 including selecting said inert gas from the group consisting of argon, nitrogen, helium, carbon dioxide, methane, and ethane.

44. The method of claim 38 including employing a first ballast tank to establish said first pressure, and employing a second ballast tank to establish said second pressure.

45. The method of claim 38 including graphitizing said carbon foam at a temperature of about 2600° C.

46. The method of claim 39 including after coking but prior to graphitizing, calcining said carbon foam.

47. The method of claim 39 including in effecting said separation employing a solvent to pitch precursor ratio of about 3:1 to 10:1.

48. The method of claim 47 including effecting said solvent preparation in an inert gas environment.

49. The method of claim 48 including effecting said solvent separation without prior hydrogenation of said pitch precursor.

50. The method of claim 46 including effecting said coking for a time of about 5 minutes to 24 hours.

51. The method of claim 50 including creating a carbon foam having voids of generally uniform size.

52. The method of claim 50 including controlling said void size at least in part by controlling the volatile content of said asphaltenes prior to coking.

53. The method of claim 50 including controlling the carbon void size at least in part by controlling the pressure applied during the coking step.

54. The method of claim 47 including said isotropic graphitized carbon foam having a compressive strength of greater than 600 lb/in$^2$.

55. The method of claim 38 including producing an open-celled carbon foam material by said method.

56. The method of claim 46 including effecting removal of inorganic impurities by said separation.

57. The method of claim 38 including prior to said separating said asphaltenes from said oils removing inorganic matter from said solvent.

58. The method of claim 57 including employing tetrahydrofuran as said solvent.

59. The method of claim 55 including effecting said separation of said asphaltenes from said oils by employing toluene.

60. The method of claim 59 including effecting said calcining at about 975° C. to 1025° C.

61. The method of claim 38 including employing as said pitch precursor petroleum feedstock admixed with bituminous coal feedstock.

62. The method of claim 61 including effecting said mixture of said bituminous coal feedstock and said petroleum feedstock and said bituminous coal with said coal being about 10–50 percent by weight of the total weight.

63. The method of claim 38 including employing a first source for providing said first pressure and a second source for providing said second pressure.

* * * * *